J. H. BREWER.
FRUIT COLLECTING APPARATUS.
APPLICATION FILED AUG. 11, 1914.
1,138,930.
Patented May 11, 1915.
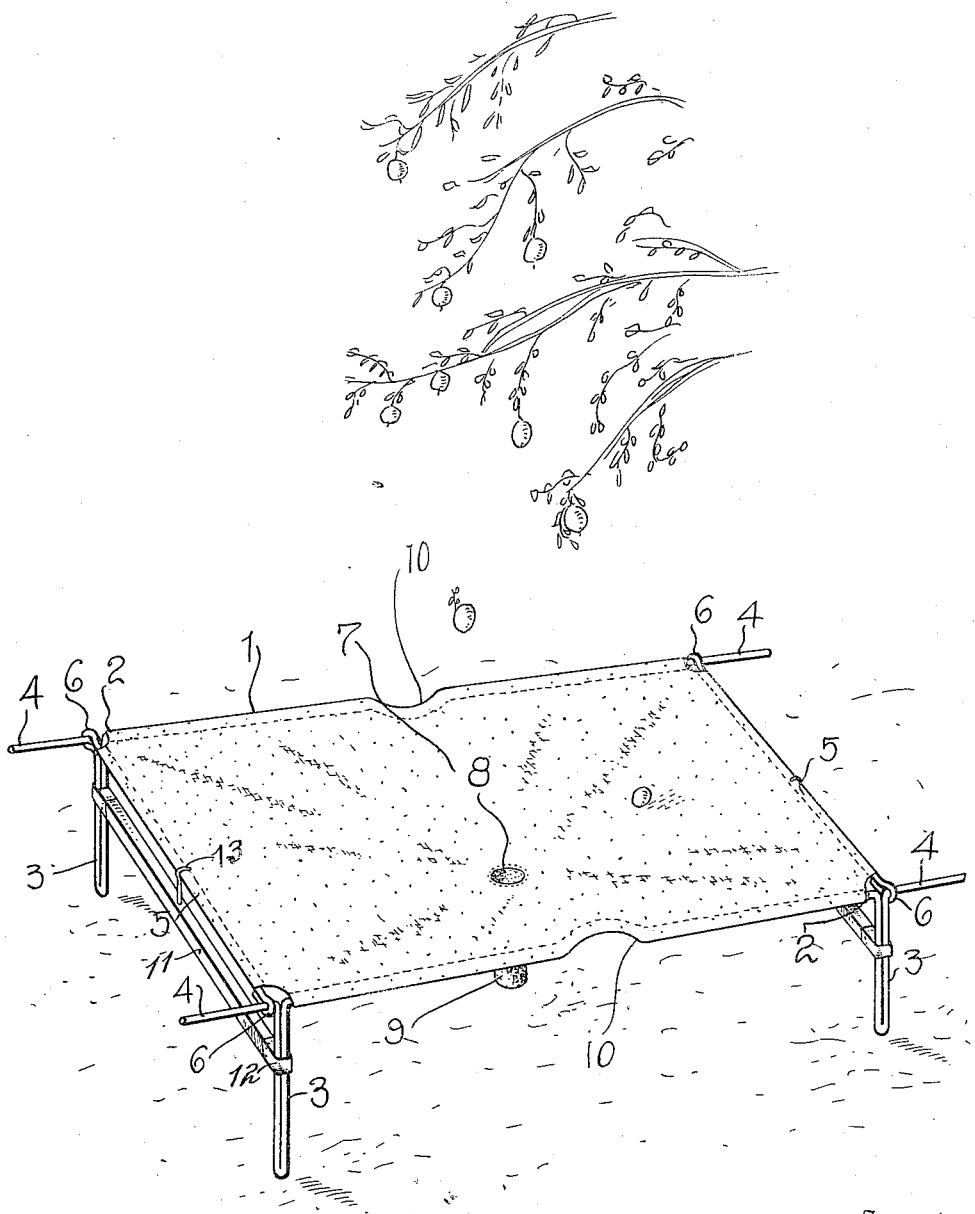
Inventor
J. H. BREWER
Witnesses
By Watson E. Coleman
Attorney

UNITED STATES PATENT OFFICE.

JOHN H. BREWER, OF SILVERTON, OREGON.

FRUIT-COLLECTING APPARATUS.

1,138,930.  Specification of Letters Patent.  Patented May 11, 1915.

Application filed August 11, 1914. Serial No. 856,235.

*To all whom it may concern:*

Be it known that I, JOHN H. BREWER, a citizen of the United States, residing at Silverton, in the county of Marion and State of Oregon, have invented certain new and useful Improvements in Fruit-Collecting Apparatus, of which the following is a specification, reference being had to the accompanying drawings.

This invention relates to new and useful improvements in fruit collecting or gathering apparatus, the main object of the present invention being the provision of a device which includes a frame which can be readily folded into compact form when not in use and is provided with supporting legs whereby to support the same in spaced relation from the ground and having a canvas secured to the frame and provided with a conductor leading down to the ground in such a manner that said canvas can be folded up and opened with the frame.

Another object of the present invention is the provision of a fruit gathering device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, the drawing illustrates in perspective a fruit gathering apparatus constructed in accordance with my invention and illustrating the operative position of the same.

In carrying out my invention, I provide a frame which is generally indicated in the accompanying drawing by the numeral 1, and which includes side members 2, said side members being preferably formed of a suitable length of rod bent upon itself adjacent each end thereof to form the elongated supporting legs 3, thence extended beyond the supporting legs to form suitable handles 4, whereby the device may be readily transported from place to place by hand. Extending between the two longitudinal side bars or rods 1, are the transverse connecting rods 5, the ends of which are bent upon themselves to form loops 6, which provide bearings for the extended end portions 4 of the longitudinal side rods 1, so that the legs 3 formed integral with the side rods can be readily folded inwardly upon the main body of the frame. Suspended between the transverse end portions 5 and the longitudinal side members 1, is a canvas receiving member 7, the longitudinal edges of which are engaged over the supporting frame and sewed or otherwise secured, to provide a sleeve, wherein the rods are movable therein. The canvas supporting member 7 is provided with a central opening 8 and communicating therewith, is a conductor 9 which is preferably formed of canvas and through which the fruit is passed while being conveyed to suitable receptacles.

From the above description taken in connection with the accompanying drawing, it will be readily apparent that I have provided a simple and durable fruit gathering device, wherein the same can be readily placed beneath the tree and the fruit shaken from said tree and it will be noted that the central portion of the canvas supporting member 7 is lower than the side portions so that the fruit, as it drops therefrom, will roll to the center out through the opening 8 and off through the conductor 9, to any suitable form of receptacle which is used for carrying the fruit from the field. It will be noted that the device can be readily conveyed from place to place by grasping the handle members 4 and lifting the gathering device from the ground. It will be noted that the leg portions 3 can be quickly and readily folded inwardly upon the lower face of the body so that the device will occupy a minimum space when not in use. This folding operation being carried out in view of the fact that the extended end members 4 of the side members are mounted for rotation within the loops 6 of the transverse members 5. The leg portions 3 are securely retained in a vertical position when set up ready for use by means of the cross bars 11, the ends of which are provided with suitable retaining loops 12 adapted to be slidably mounted upon the supporting legs 3 so that they can be quickly and readily removed when it is desired to fold the device. The supporting bars 11 are retained in an effective position and, at the same time, prevented from sliding downwardly upon the legs 3 by means of hooks 13 which are adapted to engage over the transverse members 5 to support the bars 11 in position. It will be understood that the hooks 13 will be of sufficient resiliency so that they can be readily engaged or disengaged with the transverse members 5. It will be apparent from the above that when it is desired to fold the device, the bars 11 are first disengaged from the legs 3 whereby the legs may be readily folded inwardly upon the lower side of the canvas.

The device, as a whole, is extremely simple in construction and can be manufactured and placed upon the market at a comparatively low cost.

It will be noted that the side rods 2 are provided at their medial portions with inwardly curved recesses 10, whereby to receive the body of the tree when two of the gatherers are used, one being placed upon each side of the tree. It will be noted that by having these recesses formed in the side portions, the two gatherers may be fitted tightly against the body of the tree, thereby covering all of the space beneath the tree.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a frame consisting of longitudinal side rods bent upon themselves adjacent the ends thereof to form supporting legs and having their ends projecting beyond the supporting legs to provide handles, transverse end members having their ends bent upon themselves to form bearing loops adapted to embrace the extended ends of the longitudinal side members, a canvas supporting member carried by said side and end members and having a central opening, a conductor communicating with said opening, and removable bracing means engaging said supporting legs to retain them in their effective positions, as and for the purpose set forth.

2. A device of the class described including a frame comprising longitudinal side rods having portions thereof bent upon themselves to form supporting legs and their ends extended beyond the supporting legs to form handles, transverse end members supported by said side portions and forming bearings for the side portions to rotate in, a canvas supporting member arranged between said side and end portions, bracing bars having loops formed at their ends and slidably mounted upon said supporting legs whereby to normally retain said legs in their upright positions, hook members carried by said bars and adapted to engage the transverse end portions to support the bars in their operative position.

3. A device of the class described including a frame consisting of transverse end members having loops formed at each end thereof, longitudinal side members having central indentations and having portions thereof bent upon themselves adjacent the ends to form supporting legs and having their ends projecting beyond the supporting legs to provide handles, the inner ends of the handles being rotatably mounted within the loops of the end members, whereby the legs will fold inwardly, transverse supporting bars having loops at the ends thereof adapted to receive the supporting legs to retain them in an upright position, hook members carried by the bars and adapted to engage the transverse end portions to support the bars in their effective positions, a canvas supporting member arranged between the side and end portions and having a central opening therein, and a conductor communicating with said opening, as and for the purpose set forth.

In testimony whereof I hereunto affix my signature in the presence of two witnesses.

JOHN H. BREWER.

Witnesses:
  E. E. HARRIS,
  FRANCES HOSMER.

Copies of this patent may be obtained for five cents each, by addressing the "Commissioner of Patents, Washington, D. C."